UNITED STATES PATENT OFFICE.

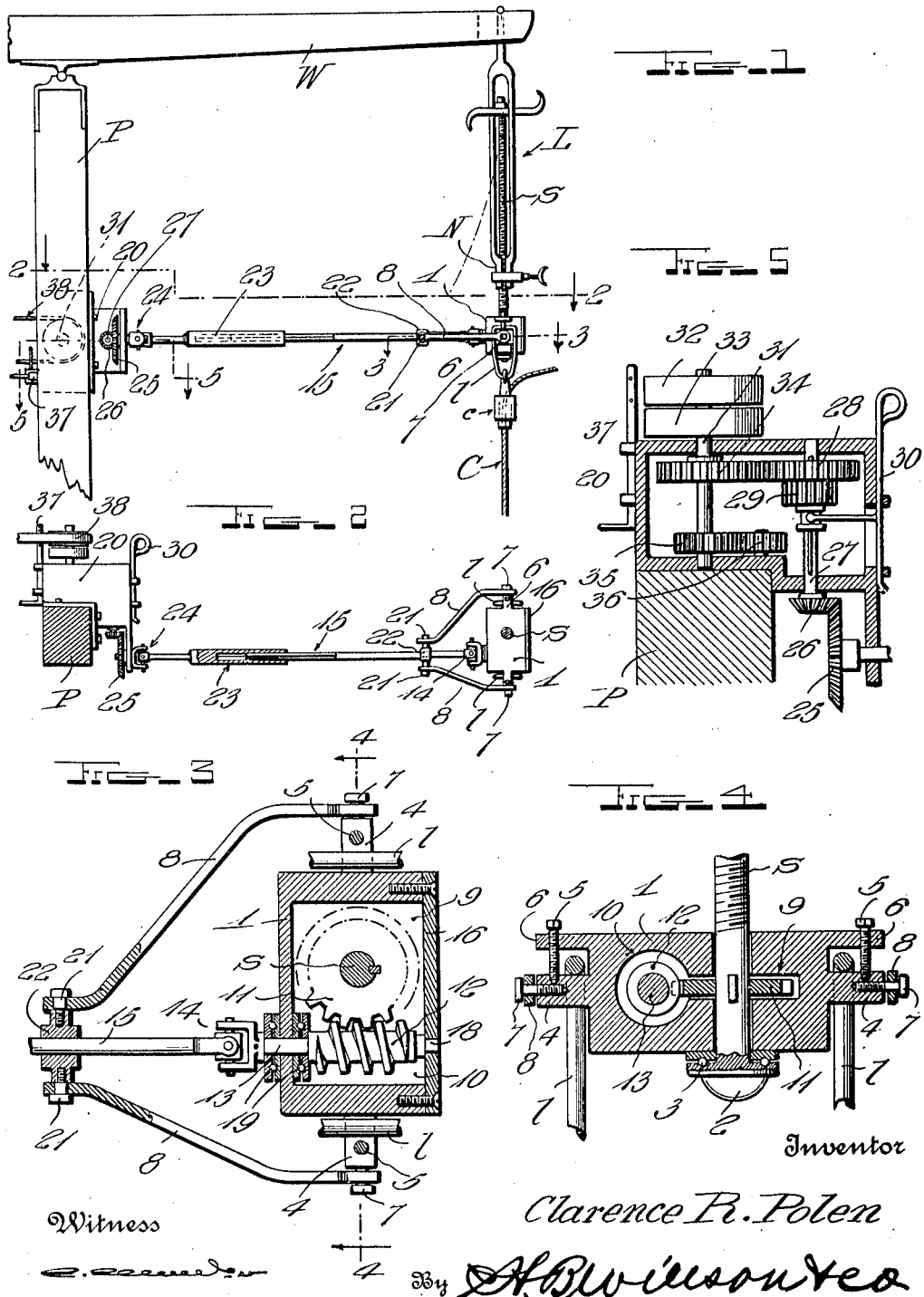

CLARENCE R. POLEN, OF EUREKA, KANSAS.

TEMPER-SCREW-ADJUSTING MEANS.

1,317,101.  Specification of Letters Patent.  Patented Sept. 23, 1919.

Application filed December 18, 1918. Serial No. 267,356.

*To all whom it may concern:*

Be it known that I, CLARENCE R. POLEN, a citizen of the United States, residing at Eureka, in the county of Greenwood and State of Kansas, have invented certain new and useful Improvements in Temper-Screw-Adjusting Means; and I do declare the following to be a full, clear, and exact description of the invention, such as will enable others skilled in the art to which it appertains to make and use the same.

In the art of well drilling, it has been the common practice to adjust the temper screw by hand as the drill drives further into the ground, but this manual adjustment is for numerous reasons undesirable and consequently numerous attempts have been made to provide other means for obtaining the same end. For instance, a worm and worm gear have been employed for turning the temper screw, employing an endless hand chain passing over a wheel for turning the worm. The principal objection to this adjusting means is that the ratio of the worm to the worm gear is necessarily low, with the result that a great many turns of the wheel are necessary to operate the screw to lower the cable and drill sufficiently. Another manner suggested for overcoming the difficulties encountered in adjusting the temper screw, is to eliminate the screw entirely and substitute a rack and pinion adjustment on the walking beam, running a chain or the like from the cable clamp over a sheave on the end of the beam and attaching it to the rack, and providing a worm and worm gear adjustment for the pinion of said rack. By this means it has been found possible to employ the power from the band wheel or other moving parts of the drilling machine to pay the cable out from the walking beam as required. In so far as I am advised, however, no successful device has been provided for adjusting the usual temper screw which is found in practically all drilling machines, by utilizing the power from the band wheel. This end my invention aims to accomplish.

In carrying out the above, a worm gear is secured on the temper screw, a worm is employed to turn said gear and screw, and a flexible shaft leads from the worm to a casing on the usual walking beam post, which casing contains gearing driven from the band wheel for turning the shaft as required; and a further object of my invention is to provide such an arrangement of parts as to permit the aforementioned shaft to serve the function previously requiring the well known jockey stick, that is, to prevent rotation of the cable clamp and temper screw when the machine is in operation.

With the foregoing in view, the invention resides in the novel features of construction and unique association of parts hereinafter fully described and claimed.

Figure 1 is a side elevation of the invention and the parts of the drilling machine with which it coöperates.

Fig. 2 is a horizontal section on the plane of the line 2—2 of Fig. 1.

Fig. 3 is an enlarged horizontal section taken substantially on the plane of the line 3—3 of Fig. 1.

Fig. 4 is a vertical transverse section on the plane of the line 4—4 of Fig. 3.

Fig. 5 is a horizontal section on the plane indicated by line 5—5 of Fig. 1, showing more particularly the forward and reverse gears for driving the operating shaft from the band wheel.

In the drawings above briefly described, P designates the usual walking beam post, W has reference to the walking beam, L indicates the link depending from the walking beam and having at its lower end the usual split nut N, through which the temper screw S is threaded. C designates the cable leading to the drilling tool, *c* refers to a cable clamp of any desired form, and *l* indicates the links which rise from the clamp *c* in the usual manner.

The screw S passes through a head or block 1 preferably of rectangular shape and is provided on its lower end with a head 2 between which and the lower side of said block, a suitable bearing 3 is located. The ends of the block are provided with projecting stubs 4 over which the links *l* pass, whereby the block will serve to connect the screw S and clamp *c*. To prevent removal of the links *l* until required, set screws 5 are by preference threaded through ears 6 on the block 1 and extended part way into the stubs 4; and these screws may serve also as means for locking a pair of cap screws 7 against rotation, said cap screws being threaded into the ends of the stubs 4 for connecting a pair of brace arms 8 to the ends of the block 1, which arms coöperate with the driving shaft to prevent rotation of the head 1 when the machine is in use.

The head 1 is provided with a horizontal recess 9 which opens through one side of said head, the greater part of said recess being substantially flat, while one end thereof is of cylindrical form as indicated at 10. The flat part of the recess 9 receives a worm gear 11 which is keyed or otherwise secured on the screw S, while the cylindrical part 10 of the recess receives a worm 12 having a stub shaft 13 extending to the exterior of the head 1 and connected by a universal joint 14 with a flexible shaft 15. A plate 16 is by preference secured to the head 1 to close the open side of the recess 9 and the worm 12 may well be provided with a stub 18 rotatable in an opening formed in said plate. At the other end of the worm, suitable thrust bearings are provided as at 19.

The shaft 15 leads to a casing 20 secured to the post P and by means of gearing in said casing, the shaft may be turned at will and it will thus be seen that the worm and worm gear may be operated to thread the screw S upwardly or downwardly through the nut N as occasion may demand; and to prevent horizontal turning of the head 1 and screw S, the arms 8 are pivoted at 21 to opposite sides of a bearing 22 which is mounted on the outer end of shaft 15, this arrangement taking the place of the jockey stick commonly employed to prevent accidental rotation of the screw as the machine is operated.

It is to be understood that any preferred gearing or other driving means may be employed for the shaft 15 and that said shaft might well be constructed in any adequate manner. However, I prefer to form said shaft of two straight sections telescoping at 23, and to employ the arrangement described below for operating said shaft.

At 24, the inner end of shaft 15 is universally connected to the shaft of a bevel gear 25 mounted on the exterior of the casing 20, said gear being driven by a pinion 26 on the end of the shaft 27 which projects outwardly from the casing 20 (see Fig. 5). On shaft 27, a relatively large spur gear 28 and a smaller spur gear 29 are slidably but non-rotatably mounted, and suitable means 30 are provided for shifting said gears longitudinally of the shaft as required. Parallel with the shaft 27 is a main operating shaft 31 which extends across the casing 20 and is provided with suitable fixed and loose pulleys 32 and 33 on its outer end for cooperation with a belt running from the usual band wheel. Mounted on shaft 31 and disposed for mesh with gear 28, is a relatively large gear 34, while a smaller gear 35 on shaft 31 meshes constantly with an idler 36 with which gear 29 may mesh. It will thus be seen that by meshing the gears 34 and 28, the former being driven, the shafts 27 and 15 will be driven in a manner to adjust the screw S in one manner, while the reverse adjustment is obtained by operating the means 30 to shift gear 29 into mesh with the idler 36, thus reversing the movement of the shaft 15. A suitable belt shifter 37 is shown for moving the belt 38 (see Fig. 2) from the loose onto the fixed pulley and vice versa.

In operation, the shaft 15 swings upon the universal joint 24 as a pivot, as the temper screw and associated parts rise and fall with the walking beam W, and whenever required, the belt shifter 37 is operated to shift the belt 38 into the fixed pulley, whereby to drive the shaft 15 and worm 12 in a direction to adjust the temper screw downwardly to the required extent, the gears 28 and 29 being properly positioned for obtaining the proper drive. As the vertical swinging of the shaft 15 takes place, and as the outer end of this shaft is lowered, the telescopic joint 23 comes into play and it will also be noted that the bearing 22 will slide slightly along the shaft 15. Throughout the operation of the machine, this bearing and shaft, together with the brace arms 8, will prevent accidental rotation of the head 1 and the temper screw S.

I attach great importance to the fact that the temper screw may be adjusted while the machine is in operation without any manual labor on the part of the attendant, since the adjusting means for said screw are driven by power from the band wheel or other rotating parts.

The fact that the screw may be either raised or lowered by power is also of advantage since it overcomes the necessity of opening the nut N and manually adjusting it to the lower end of the screw S after the latter has been lowered to the maximum. The elimination of the jockey stick and the utilization of the drive shaft 15 for the double purpose of driving the worm gear and taking the place of such jockey stick, is also very important.

Since probably the best results are obtained from the details disclosed, they may well be followed, but within the scope of the invention as claimed, numerous minor changes may be well made as occasion may demand.

I claim:

1. In a well drilling machine, a walking beam, a drill carrying cable, means connecting said cable and walking beam and including a temper screw, and power driven means for adjusting said temper screw while the machine is in operation.

2. In a well drilling machine, a walking beam, a temper screw carried thereby, a head swiveled on the lower end of said screw and having means for the attachment of the drilling cable, gearing carried by said head for turning said screw, a flexible shaft leading from said gearing, a relatively fixed part, to which said shaft extends and to which it is connected, means for driving said shaft, and means associated with said shaft and head to prevent turning of the latter.

3. In a well drilling machine, a walking beam, a temper screw carried thereby, a head swiveled on the lower end of said screw and having means for the attachment of the drilling cable, gearing carried by said head for turning said screw, a flexible shaft leading from said gearing, a relatively fixed part to which said shaft extends and to which it is connected, means for driving said shaft, a bearing mounted on said shaft, and means extending from said head to said bearing to prevent turning of the former.

4. In a well drilling machine, a walking beam, a temper screw carried by said walking beam, a head swiveled on the lower end of said screw and having oppositely projecting stubs to receive links rising from the usual cable clamp, gearing mounted on said head for turning said screw, a flexible shaft leading from said gearing, a relatively fixed part to which said shaft extends and to which it is connected, means for driving said shaft, a bearing mounted on said shaft, and a pair of diagonal arms pivotally mounted on the ends of said stubs and also pivoted to said bearing.

5. In a well drilling machine, a walking beam and a walking beam post supporting the same, a link depending from said walking beam and carrying a nut, a temper screw threaded through said nut, a head swiveled on the lower end of said screw and having a recess, said head being also provided with means for attaching a cable clamp thereto, a worm gear located in said recess and secured to said temper screw, a worm in said recess meshing with said worm gear, a gear casing mounted on said walking beam post, a flexible shaft leading from said worm to said gear casing, gearing in said casing for driving said flexible shaft as required, a bearing mounted on said flexible shaft, and means extending from said bearing to said head to prevent turning of the latter.

In testimony whereof I have hereunto set my hand.

CLARENCE R. POLEN.

Copies of this patent may be obtained for five cents each, by addressing the "Commissioner of Patents, Washington, D. C."